(12) United States Patent
Carson et al.

(10) Patent No.: X9176
(45) Date of Patent: Oct. 17, 1835

(54) CEMENT, FOR CISTERNS

(76) Inventors: William H. Carson; George Roberts

Wm. H Carson & George Roberts. - of York. co. of Livingston - New York

Letters Patent

The Schedule referred to in these Letters Patent and making part of the same, containing a description in the words of the said William H. Carson, and George Roberts themselves of their improvement in the Cement for Cisterns &c.

To all, to whom these Presents may come - Be it known that We William H. Carson & George Roberts of York, county of Livingston and State of New york have invented a new and useful invention, and that the following is a full and exact description thereof Viz. Nine Parts Sand, three parts Waterlime one part plaister Paris, and one quarter part Muriate of Soda Mix with water into a cement, to be applied to the surface of holes dug in the earth of any dimension for the purpose of holding water -

What we claim as our own invention and improvement is the addition of the Plaister of Paris and the Muriate of Soda to the other articles -

Witnesses
George Roberts Junr.
Philander S. Carson

Wm. H. Carson
George Roberts

Exd
WGl.